March 19, 1963 G. R. PARTRIDGE 3,082,300

TRANSMISSION LINE FAULT LOCATION

Filed Aug. 26, 1960

INVENTOR.
GORDON R. PARTRIDGE

BY Robert F. O'Connell

ATTORNEY

United States Patent Office 3,082,300
Patented Mar. 19, 1963

3,082,300

TRANSMISSION LINE FAULT LOCATION

Gordon R. Partridge, Sudbury, Mass., assignor to Raytheon Company, Lexington, Mass., a corporation of Delaware Filed Aug. 26, 1960, Ser. No. 52,156
14 Claims. (Cl. 179—175.31)

The present invention relates to an arrangement for locating a defective repeater station in a communication system utilizing a plurality of unattended repeater stations spaced apart along a transmission line.

Transmission line signal communication systems, when utilizing long transmission lines, incorporate a plurality of unattended repeater stations spaced apart along such transmission line. Each of these repeater stations comprises a basic amplifier inserted in the transmission line in order to boost the signal strength. In the event that one of such amplifiers should fail, it is essential to provide means to locate the faulty unit with respect to an attended station at one of the ends of the transmission line section, rather than to have to dispatch a repair crew to test each individual repeater. The accurate location of the faulty repeater is particularly desirable in transmission line systems extending over a great number of miles, and in systems wherein each unattended repeater is not readily available due to its location as for example in systems where the repeaters are elevated, buried, or submerged in liquid.

The fault locating arrangement of the present invention is applicable to various types of electrical communication systems wherein an alternating current type communication signal is repeatedly amplified by unattended amplifier units spaced along a common transmission line, and each such amplifier is supplied with direct current operating potentials over said common transmission line. The arrangement of the present invention is equally applicable without regard to the type of A.C. signal which is being transmitted, or to the type of transmission line which is utilized. For example, the signal may be voice, video, coded pulse modulation or the like; a carrier wave may be used; and the transmission line may be an open wire type, a coaxial cable, a single pair or one such pair in a plurality of cabled pairs, or the like.

It is an object of the present invention to provide a fault locating arrangement for locating a defective repeater station without ambiguity from a plurality of repeaters in a communication system of the above-described type.

A further object of the present invention is to provide a fault location arrangement which utilizes a minimum of auxiliary circuit elements, both to simplify the electrical circuitry and to economize on the over-all power requirements of the communication system.

An additional object of the present invention is to provide a fault locating arrangement whereby standard and readily available measuring means at the attended repeater station may be utilized to accurately locate an inoperative unattended repeater station.

An additional and more specific object of the invention is to provide a simplified technique for fault location in a repeater system by utilizing semiconductor monitoring and signalling means.

As a corollary to the aforesaid additional and specific objects of the invention, it is a further object to provide a simplified method of operation of such fault location arrangement including "fail-safe" considerations should the monitor auxiliary equipment itself prove faulty or inoperative.

A further specific object of the present invention is to provide the fault location arrangement requiring a minimum of simple voltmeter readings, the values of such readings being utilized in a novel and simple mathematical formula to accurately locate the faulty repeater station.

The above and further objects and advantages of the invention will become apparent to those skilled in the art in the following description of a preferred embodiment thereof, taken together with the accompanying drawings wherein.

Figures 1, 2, 3:
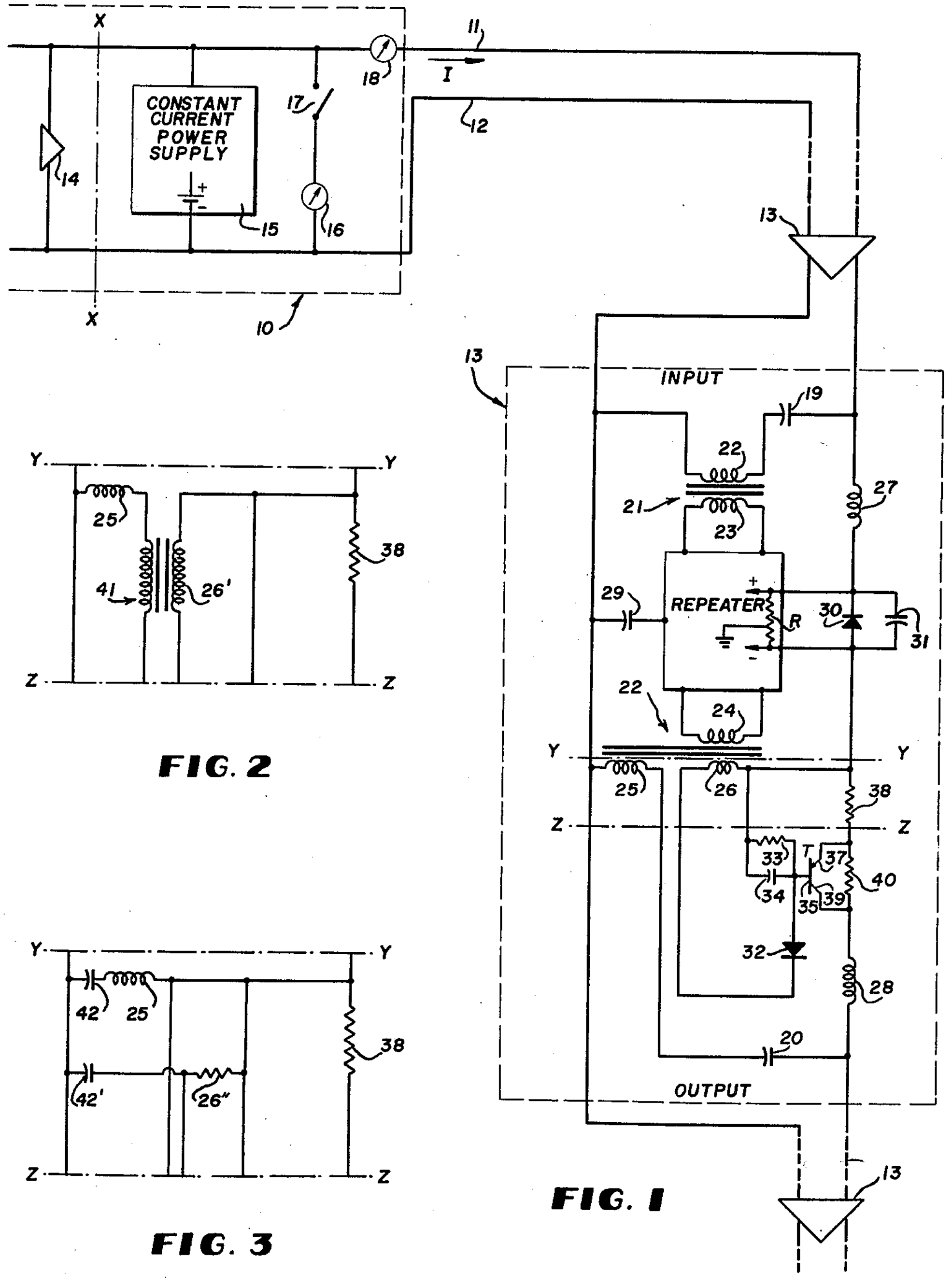
FIG. 1 is a combined block and schematic circuit diagram showing an attended repeater station and details of one of a plurality of unattended repeater stations of the communication system.
FIG. 2 is a fragmentary schematic diagram showing one possible modification of a portion of the circuit of FIG. 1.
FIG. 3 is a fragmentary schematic diagram showing a further possible modification of the same portion of the circuit of FIG. 1.

FIG. 1 shows an attended station 10 for transmitting communication signals over the transmission line 11, 12 in a direction to the right as shown in the drawing. A plurality of intervening unattended repeater stations 13 are included in the transmission line in order to boost the signal strength. Attended station 10, which may be an end or terminal station although the practice of the invention is not limited thereto, includes at least signal amplifying equipment 14. The communication apparatus in station 10 is not shown, and may take any suitable known form, and in the case of an input terminal station would include suitable input circuitry.

Attended section 10 includes a power supply 15 to provide D.C. power for operating the several unattended repeater stations 13 along the transmission line. Power supply 15 is of the constant current type and furnishes the necessary D.C. operating potential for the repeaters 13 to the right of the line X—X in FIG. 1.

Each unattended repeater station 13 includes coupling condensers 19 and 20 to allow A.C. signals to be coupled into and out of the repeater, while preventing the signal input and output windings of transformers 21 and 22, respectively, from shortcircuiting the D.C. energizing potentials which are applied across the transmission line pair 11, 12 by the power supply 15. The signal input or primary winding of transformer 21 is designated by the numeral 22, and the secondary winding of such transformer couples the A.C. signal which is to be boosted or amplified into the repeater means indicated generally by the block element labeled "Repeater." Primary winding 24 of the output transformer 22 couples the amplified A.C. signal to the secondary winding 25 of this transformer, and such amplified signal is coupled back into the transmission line for further transmission along the repeater chain to the right. Inductances 27 and 28 are included at each repeater station 13 in order to block A.C. signals and thus prevent the feedback or "singing" from the output to the input of each such amplifier. Condenser 29 is included in each repeater to provide an A.C. ground path for the communication signal.

Rectifier 30, which may be a Zener semiconductor diode, is inserted in the transmission line 11 to establish the value of the D.C. voltage supply for the unattended repeater station. Condenser 31 may optionally be included across rectifier 30 as shown in FIG. 1 for the purpose of stabilizing or smoothing the voltage supply to the repeater. Alternatively, such filtering capacitance may be provided within the repeater block element per se. The foregoing description of the unattended repeater station 13 is intended to be representative of any one of a plurality of forms of possible arrangements for such a station, and is merely exemplary of suitable known means for boosting or raising the signal strength of an A.C. communication signal along a transmission line, the D.C. power supply for each such repeater being supplied over the common transmission line.

The apparatus and circuit arrangement described so far may take any suitable form known in the prior art, and such foregoing description is merely an environmental background necessary for the understanding of the principles of the present invention.

In accordance with the invention, the fault locating apparatus and method includes means to continuously monitor the presence of an output signal voltage at each unattended repeater station, such voltage being monitored at the output of the repeater transformer 22, so that the presence of an output A.C. voltage at this point will be indicative of the operativeness of such repeater. In the preferred embodiment of the invention a tertiary winding 26 is provided on transformer 22 for the monitoring function.

The use of the tertiary winding 26 for the monitor function or for the purpose of furnishing the monitor voltage is merely one method for carrying out the method of the present invention. As will be obvious to those skilled in the art, various substitute arrangements for securing the monitoring or sampling voltage may be utilized. For example, in the arrangement shown in FIGS. 2 and 3 alternative monitoring circuitry is shown which may be connected between the circuit portions as indicated by the lines Y—Y and Z—Z of FIG. 1.

When the unattended repeater 13 is operating properly, the output transformer 22 will have an A.C. signal voltage across all its windings, and the signal voltage appearing across winding 26 may serve as a monitor source indicative of such proper operation. The voltage appearing across winding 26 is rectified by diode 32, and a voltage is thus developed across the diode load consisting of the parallel combination of resistor 33 and condenser 34 of such a polarity as to make the base 35 of the monitor transistor T negative relative to the emitter 37. Such a bias voltage as developed by diode 32 causes the transistor to be biased or switched "on," and the D.C. current I from the power source 15 flowing between resistor 38 and inductance 28 will flow through the low-resistance path through the transistor between emitter 37 and collector 39 thereof rather than through the resistor 40 which interconnects such transistor elements along the transmission line 11. Due to the low-resistance emitter-collector path through transistor T, the D.C. voltage drop between resistor 38 and inductance 28 will be of the negligible order of a few hundredths of a volt.

Should repeater 13 fail or become inoperative, no A.C. output signal would be available at the output transformer 22 and the monitor winding 26 thereof for the energization of the monitor diode 32, and thus no negative D.C. bias voltage would be developed for application at the base 35 of the transistor T. In actual practice the transistor base would be biased slightly positive with respect to the emitter 37 due to the voltage produced as the current I flows through the resistor 38 in the emitter-collector path previously described. In such a case transistor T is biased "off" below its cut off level, and the D.C. current I will see a substantial open circuit between the emitter 37 and collector 39 and must therefore flow between resistor 38 and inductance 28 by way of the resistor 40. Fault indicating or monitor resistor 40 is of a predetermined magnitude such that a voltage drop of the order of a few volts will be effected across the same due to the flow therethrough of the constant D.C. current I flowing in transmission line 11. Accordingly in the absence of an A.C. signal output from repeater 13, a larger E.M.F. or voltage potential will be required to be furnished by the power supply 15 which furnishes the energizing current for the repeater amplifier stages, since such power supply has been designated as being of the constant current type.

It will thus be apparent that upon the absence of A.C. output signals at one or more unattended repeaters the supply voltage from the constant current generator 15 will accordingly vary, the current I being maintained constant in value, and therefore a measurement of this supply voltage potential will be indicative of the number of unattended repeaters 13 which are lacking in A.C. signal output. Obviously, all repeaters subsequent to the defective one along the transmission line 11, 12 will have no A.C. output due to the fact that no A.C. signal input appears along the transmission line beyond the inoperative repeater station.

It will be assumed that there are fifty unattended repeater stations in the transmission line communication system including the right-hand end terminating repeater thereof, but the principles of this invention may be applied to any number of such stations. It will be further assumed in the exemplary system under discussion that each repeater station thereof produces a 6 volt drop in the current supply when operating properly and an 8 volt drop when such station produces no output A.C. signal. The two volt increase in voltage is occasioned by the added voltage drop due to the current I flowing through the monitor resistor 40 at the unattended station when such station is inoperative. For the purpose of this illustrative example the voltage or IR drop due to the resistance of the transmission line 11, 12 itself will be neglected. Such IR drop may readily be calculated or ascertained for the particular transmission line used, and the effect thereof may be included as a correction factor in the basic fault location method which is outlined hereafter. Assume that the unattended repeater 13 shown in FIG. 1 is the forty-fourth station in the chain of fifty repeaters, and is defective. Therefore, no A.C. output signal would appear at the outputs of repeaters #44, 45, 46, 47, 48, 49 and 50. Therefore seven repeaters draw eight volts and forty-three repeaters draw six volts. The total supply voltage will thus be:

$$(7\times8)+(43\times6)=314 \text{ volts}=V_1$$

As the next step in the fault location method the A.C. signal energization to the repeater chain is removed or turned off by de-energizing or open-circuiting the input signal from the communication equipment 14 shown to the left of the line X—X in FIG. 1. All of the repeaters in the chain then draw eight volts, and the supply voltage from the source 15 will then be:

$$(50\times8)=400 \text{ volts}=V_2$$

The change in the voltage supplied to the transmission line 11, 12 is thus: 400−314=86 volts. Dividing the 86 volt figure by 2 in accordance with the general formula developed hereafter gives: 86÷2=43; which value 43 is the number of the last operative repeater station, #43. Therefore, repeater station #44 is shown to be defective or inoperative.

The voltmeter 16 shown schematically in FIG. 1 is used to measure the voltage values across transmission line 11, 12 in carrying out the method outlined above. A switch 17 is provided in order to connect such voltmeter across the transmission line. An ammeter 18 may be included in the equipment of attended station 10 in order to indicate the value of the constant current I. In order to provide improved accuracy in carrying out the fault location arrangement of the present invention, voltmeter 16 may be provided with an adjustable zero-suppression mode of operation in accordance with known practice. In the foregoing example, such a zero-suppression mode voltmeter could be set to indicate zero when reading 314 volts, i.e., set to zero when the faulty repeater station is to be located. In such case meter 16 would then indicate the 86 volt increment directly when the actual line voltage increased to 400 volts. Furthermore, the 86 volts would then be shown on a scale of 0 to 100, whereas voltages in the range of 400+ would obviously be read on a meter scale of 0 to 500 volts.

Thus the utilization of a suppressed zero type of voltmeter would produce five times the accuracy as well as increasing the convenience of operation of the fault location method.

A general formula for locating the faulty or inoperative repeater station will be apparent from the foregoing specific example. Such formula is developed using generic symbols, wherein:

$N$=total number of consecutive numbered repeater stations
$n$=identifying number of last operative repeater station
$E_1$=D.C. IR drop of an operative repeater station
$E_2$=D.C. IR drop of inserted monitor resistor 40 at inoperative repeater station(s)
$E_1+E_2$=total D.C. IR drop at an inoperative repeater station The first voltage measurement $V_1$=(IR drop at inoperative stations)+(IR drop at operative stations), or $$V_1=(N-n)(E_1+E_2)+nE_1$$

The second voltage measurement $V_2$=(IR drop when all stations are inoperative), or $$V_2=N(E_1+E_2)$$

Subtracting these two measured voltages gives:

$$V_2-V_1=nE_2$$

Solving for $n$, the last operative repeater station, gives:

$$n=\frac{V_2-V_1}{E_2}$$

It may be shown that the general series of mathematical equations outlined above and applied in the preceding paragraphs will be applicable regardless of the number of repeater stations in the chain or the particular values of D.C. voltage drop drawn by each such station when in the operative state of transmitting A.C. output signals, and also in the inoperative state when the additional IR drop is introduced by means of the fault indicating or monitor resistor 40.

The fault location method proposed in accordance with the invention relies upon the insertion of monitor resistor 40 which effects an additional D.C. voltage drop due to its known resistance when traversed by the known current from the constant current generator when the lack of an A.C. signal output at a faulty station is detected. Such a method of monitoring and indicating is a desirable one due to the fact that the voltage supply requirements placed upon the constant current generator are minimized because the additional voltage drop is inserted only when one or more of the repeater stations become inoperative. However, it is within the principles of the present invention to arrange the monitor detector circuit in such a manner that the additional voltage dropuping resistor 40 would be maintained in the transmission line circuit when the repeater station was operative, and could be switched out of the line circuit when such repeater became inoperative. Such a modified method of operation, while not the most economical one, will work in practice, and the several equations utilized in locating the last operative repeater station "$n$" will be applicable. It should be noted that in such instance the IR drop of the monitor resistor 40 at an inoperative repeater station which is identified by the generic symbol $E_2$ would be a minus or negative quantity.

In the operation and application of the fault location method of the present invention it will be apparent that known transmission line fault indicating methods may also be incorporated therewith in practice. The principle of the present invention is one which provides a readily applied and simplified method of identifying, without ambiguity, the inoperative repeater station. However, it must be understood that the application of the principles of this invention must be accompanied with normal transmission line fault location practices. It will therefore be practical at this point to examine the effect of possible failures of the monitoring system elements of this invention upon the fault location indications, as well as the effects of nominal short-circuits and open-circuits of the interconnecting transmission line elements 11, 12.

Although the fault location monitoring equipment of the present invention and the manner of operation of the unattended repeater stations 13 of the communication system rely upon simplified and rugged circuit elements which reduce the possibility of failure to a determinable minimum, the effect of failures of certain circuit components will now be considered. In the event that the semiconductor diode 30 which supplies the operating potential to the repeater block element at the unattended station 13 should become short-circuited, then no output voltage drop thereacross would be furnished to energize such repeater. In such event there would be no output A.C. signal pulses present at transformer 22 and the windings 25 and 26 thereof. Lack of an output A.C. voltage at the monitor winding 26 would affect the voltage developed by the monitor diode 32 in the manner previously indicated, and the transistor T would be cut off to insert the fault identifying monitor resistor 40 in the transmission line circuit in the manner previously described. Loss of the IR drop "$E_1$" across a short-circuited diode 30 would affect both voltmeter readings $V_1$ and $V_2$, and thus would be self cancelling in the above formulas.

In the event that the semiconductor diode 30 at repeater station 13 should become open-circuited, then the D.C. supply voltage to the repeater block element would become unstabilized and would vary slightly from the six volt example assumed in the above discussion of operation. It will be noted that the repeater block element at the unattended station 13 includes an internal voltage dropping network designated schematically by the reference character R, where such designation is representative of the total load impedance of such repeater station along the transmission lines 11 and 12. During nominal operation of the preferred embodiment of the invention the voltage regulating semiconductor Zener diode 30 may draw five milliamperes, while the parallel path of the block repeater element draws 25 milliamperes. It will thus be seen that should the diode 30 become open-circuited that the only effect upon the repeater station 13 would be to cause a slight unbalance or increase in the D.C. operating potential supplied thereto, and accordingly the A.C. output voltage signal in transformer windings 25 and 26 would increase slightly. In most instances known to the inventor, the repeater would still operate when the voltage regulating diode 30 becomes open-circuited, and the slight increase in the A.C. signal level repeated thereby would not be appreciable in the over-all communication system. Due to the increase in the D.C. supply voltage the monitor voltage developed across winding 26 would also increase. However, the monitor diode 32 would still function in the manner indicative of the presence of an output signal in the winding 25 and the fault location arrangement would function in the manner previously outlined, and no substantial change would be indicated by voltage measurements at the D.C. voltmeter 16.

"Fail-safe" operation of the fault identifying apparatus of the invention is provided to the greatest practical extent due to the circuit arrangement utilized. If the monitor diode 32 which provides the bias to base 35 of transistor T fails, either by open- or short-circuiting, there will be no D.C. voltage developed at its load elements 33, 34. Failure to develop this bias voltage will turn transistor T "off," and therefore insert the fault indicating or monitor resistor 40 in the transmission line circuit in the manner previously described.

If the transistor T should fail due to an open-circuit between emitter 37 and collector 39 thereof, the monitor resistor 40 would be inserted in the transmission line circuit as an indication of faulty operation. However, should the transistor T fail by developing a short-circuit between its elements 37 and 39, it will be obvious that such contingency would not be one which could be signalled by the resistor 40.

In the event that a direct short-circuit occurs between the transmission line elements 11 and 12, the supply voltage indication as read on the voltmeter 16 would be noted as a reduction in value. The indicated supply voltage would fall off or be reduced in proportion to the quotient of the fault distance as measured from the attended station 10 divided by the total distance along the transmission line as measured from the station 10 to the right-hand terminating station.

In the event that the transmission line 11, 12 becomes open-circuited in either member thereof, then readings of the meter 16 would, of course, remain unchanged at the highest system level of the power supply 15. In such a case reference would be made to the ammeter 18 and the corresponding drop in the indicated current I flowing therethrough would reveal the transmission line to be open-circuited. It would then be necessary to apply the usual techniques for locating the open-circuit, and such techniques form no part of the present invention. The usual transmission line circuit continuity techniques would be employed such as the measurement of capacitance or resistance between the line pair and from each conductor to ground, as well as the physical inspection of the transmission line by a repair crew for the detection of a line break.

In certain instances, depending upon the type of signals being transmitted through the system or the circuit components available, the provision of a tertiary winding 26 upon the repeater output transformer 22 may not be feasible. In such instance the arrangement shown in FIG. 2 which utilizes a separate and auxiliary monitoring transformer may be utilized. In this figure the primary winding of an auxiliary monitoring transformer 41 is shown as being connected in series with the signal output lead from winding 25 of the repeater transformer 22. The monitor voltage is developed across winding 26' of such auxiliary transformer and is utilized in the manner previously described in that the voltage appearing across such winding is rectified by the monitor diode 32 to control the bias of transistor T. As a further optional arrangement in FIG. 2, the primary winding of auxiliary transformer 41 could be connected in parallel across the signal output winding 25 rather than in the series connection as shown, with proper observation of the necessary impedance relationships.

In the optional monitoring arrangement shown in FIG. 3 the circuit is further simplified and made more economical in that both the provision of a tertiary winding 26 upon the main repeater output transformer 22, and the use of an auxiliary monitoring transformer 41 are eliminated. In this figure the monitoring voltage is developed across the monitor impedance 26'' which is indicated schematically as being a resistance element, although in certain instances a reactive impedance may be utilized. Monitor impedance 26'' is shown as being connected in parallel across the signal output winding 25. It will be noted than an additional D.C. blocking condenser 42, in a manner similar to condenser 19, has been included in order to prevent the winding 25 from short-circuiting the D.C. power in line 11, 12, Unlike D.C. blocking condensers 19 and 20, condenser 42 is placed in series with the return leg of transformer winding 25 which connects with the D.C. power return path over transmission line 12, rather than the location in the transformer leg which connects to transmission line 11. The D.C. blocking effect is, of course, the same, however, this alternative location for condenser 42 is necessitated so that the D.C. bias circuit between base 35 and emitter 37 of transistor T is not interrupted. A further D.C. blocking condenser 42' is included in the return leg of monitor impedance 26'' as connected across the winding 25 for a similar purpose to prevent the short-circuiting of the D.C. power through such monitor impedance.

As a further alternative arrangement in the circuit of FIG. 3, the monitor impedance 26'' may be connected in series with the signal output path from the transformer winding 25, in a manner analogous to the connection shown for the primary winding of monitor transformer 41 of FIG. 2. The advantage of this circuit arrangement would lie in the fact that only one D.C. blocking condenser 42 would be required in the return leg of transformer 25, and the additional blocking condenser 42' would be eliminated with a resultant cost saving.

In carrying out the alternative circuit embodiments suggested in FIGS. 2 and 3, changes in the values of certain of the circuit components may be necessitated, as will be apparent to those skilled in the art. For example, the value of the anti-singing inductance 27 and that of the D.C. blocking and coupling condensers 19 and 20 may require changes, as well as the obvious impedance change for the output winding 25 of transformer 22. Such changes are considered to be within the knowledge of those skilled in the art, and will not be described in any greater detail herein. Further explanation is not deemed necessary, since suitable design considerations for transmission line repeater systems should be followed, which obviously depend upon the isolation of the A.C. signal under amplification from the common D.C. supply carried by the transmission lines.

Various other modifications are possible in carrying out the principles of the invention, as will be apparent to those skilled in the art. For example, when a suppressed-zero voltmeter 16 having an 0–100 volt scale is used, such scale could be re-calibrated in units which would indicate the serial numbers of the repeater stations directly, i.e. #0–#50 in the preferred embodiment, and the effect of the IR drop of the transmission line 11, 12 could also be included.

While the principles of the invention have been described above in connection with specific embodiments and particular modifications thereof, it is to be understood that this description is made by way of example only and not as a limitation on the scope of the invention, which is defined in the appended claims.

What is claimed is:

1. The method of locating the last operative repeater station of a plurality of identical cascaded alternating current signal repeater stations connected along a common transmission line, which line supplies the load energizing direct current potential from a constant current generator for all such stations, each such station effecting a first direct current potential drop when operative to repeat alternating current signals and a second direct current potential drop when inoperative to do so; which comprises the steps of measuring the line direct current potential drop of the combined operative and inoperative station load, rendering all such stations inoperative, measuring the resultant line direct current potential drop of the combined inoperative station load, computing the difference between said measured line potential drops, and dividing such difference by the difference between the first and second potential drops effected by a single station.

2. The method of locating the last operative repeater station of a plurality of identical cascaded alternating current signal repeater stations connected along a common transmission line, which line supplies the load energizing direct current potential from a constant current generator for all such stations, each such station effecting a first direct current potential drop "$E_1$" when operative to repeat alternating current signals and a second direct current potential drop "$E_1+E_2$" when inoperative to do so; which comprises the steps of measuring the line direct current potential drop "$V_1$" of the combined inoperative and operative station load, rendering all such stations inoperative, measuring the resultant line direct current potential drop "$V_2$" of the combined inoperative station load, computing the difference "$V_2-V_1$" between said measured line potential drops, and dividing such difference by the difference "$E_2$" between the first and second potential drops effected by a single station.

3. The method of determining the identifying serial number "$n$" of the last operative repeater station of a plurality of serially numbered identical cascaded alternating current signal repeater stations of a total number of "N" connected along a common transmission line, which line supplies the load energizing direct current potential from a constant current generator for all such stations, successive stations of which may be operative to repeat alternating current signals and the remainder inoperative to do so, each such station effecting a first direct current potential drop "$E_1$" when operative and a second direct current potential drop "$E_1+E_2$" when inoperative; which comprises the steps of measuring the direct current line potential drop "$V_1$" of the combined inoperative and operative station load, rendering all such stations inoperative, measuring the resultant direct current line potential drop "$V_2$" of the total inoperative station load, computing the difference "$V_2-V_1$" between said measured line potential drops, and dividing such difference by the difference "$E_2$" between the first and second potential drops of a single station, whereby $$n=\frac{V_2-V_1}{E_2}$$

when $V_1=(N-n)\times(E_1+E_2)+nE_1$, and $$V_2=N(E_1+E_2)$$

4. Apparatus for indicating the location of the last operative serially numbered repeater station of a plurality of identical cascaded alternating current signal repeater stations connected along a common transmission line, which line supplies the load energizing direct current potential for all such stations, each operative station effecting a first predetermined direct current potential drop along said line when operative to repeat alternating current signals, including, in combination, a constant current generator of energizing direct current potential connected to the origin of said line, monitor means operative to effect a second predetermined direct current potential drop at each station when inoperative to repeat alternating current signals, means to render all such stations A.C.-inoperative by disconnecting the A.C. signal from the origin of said line, and voltage measurement means at said generator to indicate a first direct current line potential drop of the combined alternating current inoperative and alternating current-operative station load and a second direct current line potential drop when all stations are rendered alternating current inoperative, the difference between such measured voltages being proportional to the location of the last operative repeater station.

5. Apparatus for indicating the location of the last operative serially numbered signal repeater station of a plurality of identical cascaded alternating current signal repeater stations connected along a common transmission line, which line supplies the load energizing direct current potential for all such stations, each such station effecting a first predetermined direct current potential drop along said line when operative to repeat an alternating current signal, including, in combination, a constant current generator of direct current energizing potential connected to the origin of said line, monitor means operative to effect a second predetermined direct current potential drop at each station which is inoperative to repeat an alternating current signal, means operative to render all such stations inoperative to repeat an alternating current signal, and voltage measurement means at said generator to indicate a first direct current line potential drop of the combined inoperative and operative station load and a second direct current line potential drop when all stations are rendered inoperative, the difference between such measured voltages when divided by a factor related to said second direct current potential drop at each inoperative station indicating the serial number of the last operative repeater station.

6. Apparatus for indicating the location of the last operative serially numbered signal repeater station "$n$" of a plurality of identical cascaded alternating current signal repeater stations of a total number "N" connected along a common transmission line, which line supplies the load energizing direct current potential for all such stations, each such station effecting a first predetermined direct current potential drop "$E_1$" along said line when operative to repeat an alternating current signal, including, in combination, a constant current generator of direct current energizing potential connected to the origin of said line, monitor means operative to impose a second predetermined direct current potential drop "$E_1+E_2$" at each station which is inoperative to repeat an alternating current signal, means operative to render all such stations inoperative to repeat an alternating current signal, and voltage measurement means at said generator to indicate a first direct current line potential drop "$V_1$" of the combined inoperative and operative station load and a second direct current line potential drop "$V_2$" when all stations are rendered inoperative, the difference between such measured voltages when divided by a factor related to said second direct current potential drop at each inoperative station indicating the serial number of the last operative repeater station, whereby $$n=\frac{V_2-V_1}{E_2}$$

when $V_1=(N-n)\times(E_1+E_2)+nE_1$, and $$V_2=N(E_1+E_2)$$

7. A transmission line alternating current signalling system including, in combination, a transmission line, a plurality of identical cascaded alternating current signal repeater stations spaced along said line, a direct current generator supplying energizing potentials for all such repeaters connected to the origin of said line, each signal repeater station including an alternating current amplifier having at least signal input means, signal output means, and a direct current energizing potential input means, a monitor circuit coupled to the amplifier signal output means including monitor means to detect the presence of alternating current signals at such output means, and switch means controlled by said monitor means to selectively effect a direct current potential drop along said line at the repeater station in the absence of alternating current signals at the output thereof.

8. A transmission line signalling system in accordance with claim 7 wherein said direct current energizing potential input means at each signal repeater station effects a first predetermined direct current potential drop along said line, and said switch means effects a second predetermined direct current potential drop.

9. A transmission line signalling system in accordance with claim 7 wherein said switch means comprises a biased transistor stage.

10. A transmission line signalling system in accordance with claim 7 wherein said switch means comprises a biased transistor stage controllable to selectively shunt a fixed impedance located in series with said line at the repeater station.

11. An alternating current signal repeater station for insertion along a transmission line, which line supplies the direct current energizing potential for a plurality of identical cascaded stations, including, in combination, a signal amplifier, means to couple alternating current input signals from said line into said amplifier, means to couple a direct current energizing potential from said line into said amplifier, means to couple amplified alternating current output signals from said amplifier into said line, a monitor circuit to detect the presence of such amplified alternating current signals including switch means controlled by detected alternating current output signals to selectively effect a direct current potential drop along said line at the repeater station in the absence of alternating current signals at the output thereof.

12. An alternating current signal repeater station in accordance with claim 11 wherein the direct current energizing potential coupled into said amplifier effects a first predetermined direct current potential drop along said line, and said switch means effects a second predetermined direct current potential drop.

13. An alternating current signal repeater station in accordance with claim 11 wherein said switch means comprises a biased transistor stage.

14. An alternating current signal repeater station in accordance with claim 11 wherein said switch means comprises a biased transistor stage controllable to selectively shunt a fixed impedance located in series with said line at the repeater station.

References Cited in the file of this patent

UNITED STATES PATENTS

| | | |
|---|---|---|
| 2,260,160 | Benning et al. | Oct. 21, 1941 |
| 2,321,723 | Zinn | June 15, 1943 |
| 2,744,170 | Daly et al. | May 1, 1956 |